3,424,722
PHENYL-CAPPED POLYPHENYLENE ETHERS
Robert A. Jerussi, Scotia, and Michael R. McCormick, Schenectady, N.Y., assignors to General Electric Company, a corporation of New York
No Drawing. Filed Jan. 2, 1968, Ser. No. 694,801
U.S. Cl. 260—47
Int. Cl. C08g 23/16
4 Claims

ABSTRACT OF THE DISCLOSURE

The residual hydroxyl groups of polyphenylene oxides are converted to phenyl ether groups to produce a capped polymer, which is heat-stabilized and also resistant to hydrolysis under alkaline conditions. These phenyl ether substituents are introduced into the polyphenylene oxide by first converting the residual hydroxyl groups of polyphenylene oxide in solution to the corresponding alkali metal salt. Thereafter, the polymer is reacted at a temperature in the range of 200–300° C., with a monohalobenzene in the presence of a dissolved copper salt and an amine which is thermally stable under the reaction conditions, until essentially all of the alkali metal of the salt groups have been etherified with phenyl groups. The polymers of this invention are useful for all the applications of the initial polymer and, in addition, heat and alkali-resistant articles.

---

This invention relates to polyphenylene oxides, also called polyphenylene ethers, and more particularly to the stabilization of these polymers by conversion of the hydroxyl groups to phenyl ether groups, i.e., the residual hydroxyl groups of the polymer have been etherified or capped with the phenyl groups, and to a process of producing the same.

The preferred polymers are poly-(1,4-phenylene oxides) since such polymers are generally of much higher molecular weight than the poly-(1,2-phenylene oxides) or poly-(1,3-polyphenylene ethers). However our process is equally applicable to these other polyphenylene oxides. The polyphenylene ethers useful in practicing this invention, and a process of producing the same, are disclosed and claimed in U.S. Patents 3,306,874 and 3,306,875, the contents of which are incorporated herein, by reference. These polymers have at least 100 repeating units in the polymer molecule. The most readily available polymers are the poly-(2,6-disubstituted - 1,4 - phenylene oxides). Polyphenylene oxides are characterized by unique combination of chemical, mechanical and electrical properties over a broad range of temperatures which render them suitable for many commercial applications. These polymers when subjected to elevated temperatures especially in the presence of oxygen-containing gases, are somewhat thermally unstable tending to become discolored and embrittled. The cause of this is not fully understood, however, it appears that the presence of the hydroxyl groups, disposed primarily on the terminal portion of the polymer, contributes to the degradation. Although these hydroxyl groups can be converted to ester groups by reacting either with acyl halides of monocarboxylic acids or anhydrides of such acids, these ester groups are subject to hydrolysis when such polymers are used in an alkaline medium, which converts the ester groups back to the hydroxyl group. Conversion of the hydroxyl groups to alkyl ethers, although beneficial, still does not stabilize the polyphenylene oxides to heat to the desired degree.

It has now been unexpectedly found that these hydroxyl groups can be converted to phenyl ether groups which thereby not only overcome the disadvantages of the hydroxyl groups, but such ether groups are not hydrolyzable by alkaline media. Such phenyl capped polyphenylene oxide polymers are not only more resistant to the effects of elevated temperatures, but also can be used in alkaline media with no danger of regenerating the hydroxyl groups.

Accordingly, an object of this invention is to provide a polyphenylene oxide having superior ability to withstand discoloration and embrittlement upon exposure to an oxygen-containing atmosphere at elevated temperatures for prolonged periods of time.

Another object to this invention is to provide a stable polyphenylene oxide which can be used in alkaline media.

Another object of this invention is to provide a process for producing such stabilized polyphenylene oxides.

Other objects and advantages of this invention will be apparent in light of the following description.

Briefly stated, the objects of this invention are achieved by first converting the hydroxyl groups of the polyphenylene oxides to the corresponding alkali metal salts and thereafter reacting with a monohalobenzene in a solution also containing dissolved therein, a soluble copper salt and amine thermally stable under the reaction conditions by heating such solution to a temperature in the range of from 200° C. to 300° C., for a time sufficient to replace essentially all of the alkali metal of such salt groups with phenyl groups.

The expression "polyphenylene oxides" and more specifically "poly-(1,4-phenylene oxides)" as used herein, is meant to include within its scope, those polymers including copolymers, disclosed and claimed in the above-noted patents, as well as polymer blends, and graft copolymers wherein, the polyphenylene oxide is present in a substantial quantity.

The monohalobenzenes useful in practicing our invention, are chlorobenzene, bromobenzene and iodobenzene. Of these, bromobenzene and chlorobenzene are preferred because they are more readily available as commercial products and much lower in cost. Bromobenzene is more reactive than chlorobenzene and is therefore, the preferred halobenzene.

In converting the hydroxyl groups of the polyphenylene oxides to salt groups, any of the alkali metal hydroxides, for example, lithium hydroxide, sodium hydroxide, potassium hydroxide, rubidium hydroxide or cesium hydroxide may be used. However, since it is necessary to dissolve the polyphenylene oxide in a solvent prior to forming the salt with the hydroxyl groups, it is generally desirable to speed up the reaction by using the alkali metals in the form of their alkoxide, so that they are soluble in the solution and therefore form the salt more rapidly. However, if desired an emulsion technique can be used wherein the polymer is dissolved in one phase and the alkali metal compound is dissolved in a separate phase, with the solution of the polymer being separated from the other phase prior to reaction with the monohalobenzene.

A particularly useful and preferred method of forming the alkali metal salts of the polyphenylene oxides is that disclosed in the copending application of Hay, Ser. No. 672,956, filed Oct. 5, 1967, and assigned to the same assignee as the present invention. In this method, a solution of the polymer, in an anhydrous solvent and inert atmosphere, is reacted with the alkali metal ketyl of a diaryl ketone. These ketyls are highly colored solutions and therefore permit a solution of the polyphenylene oxide to be titrated with this material until the color of the ketyl just persists, indicating that all the hydroxyl groups of the polyphenylene oxide have now been converted to the alkali metal salt. Also, by knowing the titer of the ketyl, the required amount of monohalobenzene to be used can be readily calculated. No harm results if an excess of the monohalobenzene is used and in fact, it is desirable to use several times the required amount to insure complete reaction.

Since the diaryl ketones are solid and the ketyls are unstable, except in solution, a liquid is used which is both a solvent for the diaryl ketone and the ketyl, and is non-reactive with the ketone, the alkali metal or the ketyl.

Particularly useful solvents are the dialkyl ethers of ethylene glycol and diethylene glycol, the dimethyl ether of ethylene glycol, the dimethyl ether of diethylene glycol, etc., or cyclic ethers, for example, tetrahydrofurans, alkyl substituted tetrahydrofuran, etc. Aromatic hydrocarbons can be used as solvents providing they are used in conjunction with a tertiary alkyl amine, including polyamines. Since an amine will also be necessary for the etherification reaction and the aromatic hydrocarbons are useful solvents, aromatic hydrocarbons in conjunction with the amine are useful in forming the ketyls for the salt forming reaction. In such solvents, the diaryl ketones readily react with and dissolve the solid alkali metals, preferably used in finely divided form, to produce highly colored ketyls.

Since both the alkali metal and the ketyls are extremely reactive with oxygen, carbon dioxide, and moisture, precautions must be taken to use anhydrous materials and to store the solution of the ketyls in a dry inert atmosphere. This precaution also must be observed for the reaction of the ketyl with the polyphenylene oxides. More specific information concerning the making and the using of these ketyls is to be found in the above-identified copending application which is incorporated herein by reference.

In carrying out the reaction between the salt form of the polyphenylene oxide and the monohalobenzene, the solvent used for dissolving the polymer should be a non-reactive solvent and should be thermally stable and capable of dissolving the polymer in its salt form. Generally, the aromatic hydrocarbons are excellent solvents, for example, toluene, benzene, xylene, or mixtures thereof. If desired the monohalobenzene itself can be used in an excess amount as a solvent. Since these solvents have boiling points lower than the temperature required for the reaction, the use of pressure at least equal to the autogeneously generated pressure of the reaction mixture is necessary. Although not required, better quality products are obtained if air in the equipment is replaced with an inert gas, for example, nitrogen, argon, xenon, krypton, etc.

Generally, the salt forming reaction to form the alkali metal salts with the hydroxyl groups of the polyphenylene oxide is carried out on the same solution which will be used in the etherifying reaction. In carrying out the etherifying reaction, the halobenzene in an amount sufficient to supply at least one phenyl group for each hydroxyl group and generally in an amount two to ten times this quantity, is added to the solution of the polyphenylene oxide in its salt form. This excess aids in insuring completeness of the etherifying reaction and can be recovered and reused. At the same, a copper salt which may be either a cuprous or cupric salt and the amine is added. Only small amounts of these reagents need to be used, in the order of 2–10% copper salt based on the weight of the polymer. Generally the amount of amine used is based on the amount of copper salt used, and is generally .25–2 atoms of amine nitrogen per atom of copper.

The solution is contained in an autoclave in which preferably the air in the vapor phase is replaced with an inert gas, and the reaction mixture is heated preferably with stirring, to a temperature in the range of 200–300° C. without added pressure over that generated by the vapor pressure of the reaction mixture. Higher pressures can be used, if desired, but are not necessary. Under these conditions, the monohalobenzene reacts readily with the alkali metal of the salt groups forming the alkali metal salt of the halide with a phenyl group now being on the oxygen of the former salt group.

The reaction is quite rapid being over in a matter of several hours for essentially complete conversion of the hydroxyl groups in the form of the alkali metal salt to phenyl ether groups, i.e., phenoxy groups. Surprisingly enough, this reaction cannot be carried to completion either in the absence of the amine or the soluble copper salt. Substitution of copper metal for the soluble copper salt also causes the reaction to go to some degree, but not to completion. Only a very low conversion is obtained if both the copper and the amine are omitted and only the metal alkali salt of the polyphenylene oxide is reacted with the monohalobenzene. Since the partially capped polymers, obtained with these other catalysts or in the absence of catalyst, have residual hydroxyl groups, they do not have the desirable properties of the essentially completely phenylcapped polymers produced by our process.

The copper salts useful in practicing our invention are the cuprous and cupric salts of mineral acids, for example, cuprous chloride, cuprous bromide, cupric bromide, cupric chloride, cuprous sulfate, cupric sulfate, and of carboxylic acids, for example, cuprous acetate, cupric acetate, cuprous propionate, cupric propionate, cuprous benzoate, cupric benzoate, etc. Cuprous salts appear to be more effective than the cupric salts. Since it is the copper ion in solution that is the effective catalyst, it may be associated with any anion that is stable at the reaction temperature and does no render the copper ion, complexed with the amine, insoluble in the reaction medium.

Because of the high temperature used in the etherifying reaction, the amine, like the copper salt, must be thermally stable at the reaction temperature. Generally, tertiary amines are more thermally stable than the primary or secondary amines, and saturated aliphatic amines are more thermally stable than aromatic amines and therefore are generally preferred. However, any amine which is thermally stable at the reaction conditions can be used. Typical amines which we may use are any of those amines which are disclosed in the above-mentioned U.S. patents. They include, by way of example, mono-, di- and trialkyl amines, the corresponding alkylene diamines, the corresponding dialkylene triamines, cyclic alkyl amines, heterocyclic amines, e.g., pyridine, etc. Since thermal instability of the amines arises because of oxidation, the use of an inert atmosphere for the etherification reaction permits a wider group of amines to be used for the reaction than can be used in an oxygen containing atmosphere.

In order that those skilled in the art may better understand my invention, the following examples are given by way of illustration and not by way of limitation.

In all the examples, all parts and percentages are by weight unless stated otherwise. Intrinsic viscosities are given in dec. l./g. measured in chloroform at 25° C.

EXAMPLE 1

A solution of 60 g. of poly-(2,6-dimethyl-1,4-phenylene) oxide, having an intrinsic viscosity (I.V.) of 0.49 and an infrared absorbance per gram (abs./g. X 100) of 74 at 3605–3610 cm.$^{-1}$ due to hydroxyl groups, in 500 ml. of a mixed solvent containing two volumes of bromobenzene to three volumes of toluene was titrated with the potassium ketyl of benzophenone made by dissolving 3.6 g. of potassium in a solution of 8.4 g. of benzophenone and 13 g. of triethylamine in 50 ml. of benzene. A total of 25 ml. was required, after which the solution was diluted to a volume of 600 ml. with additional bromobenzene-toluene mixture of the same ratio as initially used. The final solution contained 10% polyphenylene ether and was 0.1 molar in respect to triethylamine. After adding 5.28 g. of cuprous bromide, the solution was transferred to a stainless steel autoclave and purged with nitrogen. The autoclave was heated to 250° C. and held at this temperature for 1 hour and thereafter cooled to ambient temperature. The reaction solution was diluted with toluene, filtered through diatomaceous earth and concentrated to about 600 ml. The polymer was precipitated by an addition of 3.5 liters of methyl alcohol. The first liter containing 15 ml. of concentrated hydrochloric acid and was added dropwise. After washing well several times with hot methyl alcohol, the polymer was isolated and dried at 60° C. at 20 mm. pressure. There was obtained a yield of 57.4 g. of polymer having an I.V. of 0.60 and an abs./g. X 100 of 17.6. This polymer could be readily hot-pressed into a molded object. Since the background abs./g X 100 at this frequency is 14–15, this polymer has essentially all of the hydroxyl groups of the starting phenol converted to phenoxy groups.

EXAMPLE 2

A solution of .277 g. of the phenyl-capped polymer of Example 1, was dissolved in 11.1 ml. of toluene in nitrogen atmosphere, along with 0.94 ml. of methanol and 0.055 g. of sodium methoxide. This solution was heated at reflux for 18 hours, cooled and acidified with a 3% methanolic hydrogen chloride solution. After isolation of the polymer and drying at 60° C., over the weekend, the abs./g. X 100 was only 31.8, showing that this phenyl-capped polymer was extremely resistant to hydrolysis in the presence of a highly alkaline medium.

EXAMPLE 3

In a similar manner to Example 1, with the exception that the titrant was made up using 5.4 g. of trimethylamine and only bromobenzene was used as the solvent, poly-(2,6-diphenyl-1,4-phenylene oxide) having an intrinsic viscosity of 0.63 and an abs./g. X 100 of 64 at 3550 cm.$^{-1}$ was reacted to give a phenyl-capped polymer which showed no absorbance at 3550 cm.$^{-1}$, showing that all of the hydroxyl groups have been converted to phenoxy groups. At this frequency there is no background absorbance.

EXAMPLE 4

In a manner similar to Example 1, poly-(2-methyl-6-phenyl-1,4-phenylene oxide) having an intrinsic viscosity of 0.57 and an absorbance per gram (abs./g. X 100) of 76 at 3560 cm.$^{-1}$ was reacted to give a phenyl-capped polymer whose absorbance was only 6 abs./g. X 100 at 3560 cm.$^{-1}$. The background value at this frequency is 4–6. This polymer was, therefore, essentially fully capped- i.e., the hydroxyl groups had been converted to phenoxy groups.

EXAMPLE 5

In a reaction similar to Example 1 an essentially identical result was obtained where an equivalent amount of cuprous chloride was used instead of cuprous bromide. Also essentially identical results were obtained when the triethylamine was replaced by an equivalent amount of diethylamine. Other amines which can be used are butylamine, dibutylamine, tributylamine, hexylamine, octylamine, cyclohexylamine, pyridine, piperidine, N,N,N',N'-tetramethylethylenediamine, etc. Other satisfactory amines are those previously disclosed.

Similar results to those given above in the specific examples are obtained when the other polyphenylene ethers of this invention mentioned are used in the above examples.

The polymers of this invention can be used in any of the wide variety of applications which polyphenylene ethers of the above-referenced patent have been used, for example, in the making of fibers, films, molded objects and the like. The fact that they have improved color and better heat-stability makes the polymers of this invention more widely applicable, for example, in the making of light colored or colored objects, for example, films and fibers where transparency or lack of off-shade is highly desirable. The improved resistance to hydrolysis to alkaline media permits them to be used for objects which will be exposed to alkaline conditions in use, for example, agitators for dish or clothes washers, etc.

Obviously, other modifications or variations to the present invention are possible in light of the above teachings. It is therefore to be understood that changes may be made in the particular embodiments of the invention described which are within the full intention and scope of the invention as defined by the appended claims.

What we claim as new and desire to secure by Letters Patent of the United States is:

1. A poly-(1,4-phenylene oxide) having at least 100 repeating units in the polymer molecule wherein essentially all of the hydrogens of the hydroxyl groups have been replaced by phenyl groups.

2. The composition of claim 1 wherein the poly-(1,4-phenylene oxide is poly-(2-6-dimethyl-1,4-phenylene oxide).

3. The composition of claim 1 wherein the poly-(1,4-phenylene oxide) is poly-(2,6-diphenyl-1,4-phenylene oxide).

4. The composition of claim 1 wherein the poly-(1,4-phenylene oxide is poly-(2-phenyl-6-methyl-1,4-phenylene oxide).

References Cited

UNITED STATES PATENTS

| 3,207,727 | 9/1965 | Matsubayashi et al. | 260—67 |
| 3,244,672 | 4/1966 | Hermann et al. | 260—67 |
| 3,306,874 | 2/1967 | Hay | 260—47 |
| 3,306,875 | 2/1967 | Hay | 260—47 |
| 3,375,228 | 3/1968 | Holoch et al. | 260—47 |

WILLIAM H. SHORT, *Primary Examiner.*

M. GOLDSTEIN, *Assistant Examiner.*

U.S. Cl. X.R.

260—30.4, 33.2, 33.4, 33.6, 33.8